United States Patent
Fukazawa et al.

(12)
(10) Patent No.: US 6,646,398 B1
(45) Date of Patent: Nov. 11, 2003

(54) SAFETY DEVICE FOR POWER WINDOW

(75) Inventors: Fusao Fukazawa, Shizuoka (JP); Keiichi Tajima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 63 days.

(21) Appl. No.: 09/686,175

(22) Filed: Oct. 12, 2000

(30) Foreign Application Priority Data

Oct. 18, 1999 (JP) .......................................... 11-294843

(51) Int. Cl.[7] .......................... G05B 5/00; H02H 7/08; H02P 1/00; E05F 15/02; E05F 11/48
(52) U.S. Cl. ....................... 318/445; 318/455; 318/264; 49/28; 49/349; 49/352
(58) Field of Search ........................ 318/445, 452–455, 318/458, 466–470, 264–266, 282, 630; 49/26, 28, 348, 349, 352

(56) References Cited

U.S. PATENT DOCUMENTS

| 4,737,674 A | * | 4/1988 | Miyao ........................ 318/254 |
| 4,789,812 A | * | 12/1988 | Nakamura ................... 318/254 |
| 5,351,439 A | * | 10/1994 | Takeda et al. ................. 49/28 |
| 5,404,673 A | | 4/1995 | Takeda et al. ................. 49/28 |
| 5,422,551 A | | 6/1995 | Takeda et al. ............... 318/265 |
| 5,459,379 A | | 10/1995 | Takeda et al. ............... 318/469 |
| 5,610,484 A | * | 3/1997 | Georgin ..................... 318/286 |
| 5,832,664 A | * | 11/1998 | Tajima et al. ............... 318/434 |
| 5,986,421 A | * | 11/1999 | Fukazawa et al. ........... 318/282 |
| 6,201,389 B1 | * | 3/2001 | Apel et al. ................. 324/207.2 |

FOREIGN PATENT DOCUMENTS

| DE | 197 01 927 C1 | | 6/1998 | | |
| JP | 11-62382 | | 3/1999 | ........... E05F/15/10 |
| JP | 11219550 A | * | 8/1999 | ........... G11B/15/43 |
| JP | 11-256916 | | 9/1999 | ............. E05F/5/08 |
| JP | 11-256920 | | 9/1999 | ........... E05F/15/10 |
| JP | 2000274142 A | * | 10/2000 | ........... E05F/15/10 |

OTHER PUBLICATIONS

Patent Abstract of Japan, 11–256920, Sep. 21, 1999.
Patent Abstract of Japan, 11–256916, Sep. 21, 1999.
Patent Abstract of Japan, 11–062382, Mar. 5, 1999.

* cited by examiner

*Primary Examiner*—Robert E. Nappi
*Assistant Examiner*—Edgardo San Martin
(74) *Attorney, Agent, or Firm*—Sughrue Mion, PLLC

(57) ABSTRACT

A power-window safety device which includes an annular magnet 21 mounted on a rotary shaft (9*a*) of a drive motor (9) for opening and closing a window glass of an automotive vehicle, and a magnetic flux sensor (20), disposed facing the annular magnet (21), for sensing a change of a magnetic flux developed from the annular magnet (21), which change in flux is caused by rotation of the rotary shaft (9*a*). The magnetic flux sensor includes Hall ICs (22A and 22B). An operational element (24A, 24B) performs a process of linearly approximating a sinusoidally varying voltage output from a Hall element (23A, 23B) which is provided in association with the operational element, and produces an output voltage (VA, VB) thus processed. Every angular position of the rotary output shaft, or every opening/closing position of the window glass, is detected over the range of one complete rotation on the basis of the output voltages (VA and VB) that are generated through the rotation of the rotary shaft (9*a*). A safety control operation is carried out, to prevent an object from being caught, on the basis of the detected position.

7 Claims, 10 Drawing Sheets

SAFETY DEVICE FOR POWER WINDOW

BACKGROUND OF THE INVENTION

1. Field of the Invention

The present invention relates to a power window device for an automotive vehicle, wherein a window glass is opened and closed by a drive source, e.g., a motor. More particularly, the invention relates to a power-window safety device which detects a state wherein a hand, head or the like of a person is caught between the window glass and the sash, wherein the power window device of the present invention carries out a safety control operation so as to prevent the window from closing in such a dangerous situation.

2. Related Art

In a general power window, the window glass is opened and closed by a motor. Accordingly, an accident wherein a hand, head or the like of a passenger is caught between the window glass and the sash, often occurs. A power-window safety device for protecting the passenger or the like against such an accident has been proposed. The proposed safety device detects a state wherein an object is caught between the window glass and the sash, and stops the closing operation of the window glass, or opens the window glass. More precisely, in the proposed safety device, a pulse generator including a Hall element is attached to the motor for driving the window glass. A speed detector detects a speed of the closing window glass by counting pulses output from the pulse generator. Further, the proposed safety device detects a direction of the moving window glass—either the closing or opening direction—and judges whether the window glass is in a safety control region where a safety operation should be carried out to prevent an object from being caught. The safety device detects when an object is caught, i.e., an object-caught state, on the basis of a change in the rate of the detected speed during the closing operation of the window. If the safety device detects that an object is caught, it executes a safety control operation wherein it forcibly moves the window glass in the opening direction to release the object from being caught in the window.

In the safety control region judgment technique, however, an unwanted situation may occur wherein the safety device mistakenly judges the safety control region due to an error in counting the pulses. This necessitates the following measure to reset the pulse counter: first, the window is set to its full open position—because a full open position of the window glass is highly accurately detected by providing a window glass position detecting mechanism, such as a limit switch, near the upper limit of the window glass—and then a safety control region is set based on the full open position. In a specific example of the reset measure, position-sensors are disposed along a rail along which the window is moved for opening and closing. The position sensors' resistance values, which vary with opening/closing positions of the window glass, are detected. The safety control region is then judged on the basis of the detected resistance values.

In the conventional safety device, which uses the pulse generator and the window glass position detecting mechanism, pulses output from the Hall element of the pulse generator are counted. Therefore, the conventional safety device cannot detect angular positions of the motor, or the window glass positions, at steps each shorter than the pulse width of the pulse signal output from the pulse generator. This makes it difficult to control the window glass position with high precision.

Further, to detect the safety control region, a window glass position detecting mechanism is needed in addition to the pulse generator. This leads to complexity in the construction of the whole device. The sash, which comes into contact with the window glass when the window is fully closed, is provided with a weather strip. The weather strip will be deformed when ambient conditions of temperature and the like vary. At this time, the full closing position of the window glass also shifts from its original position, and the safety control region also shifts from its original position. A mechanical means, like the window glass position detecting mechanism, which directly detects the window glass position, lacks the flexibility to detect such changes in ambient condition and, therefore, is unable to account for such a temperature variation.

SUMMARY OF THE INVENTION

Accordingly, an object of the present invention is to provide a power-window safety device which is advantageously includes a simplified construction, improved accuracy of detecting opening/closing positions of the window glass, and further includes the ability to account for a shift of the safety control region caused by a change in the ambient conditions.

To achieve the above and other objects, there is provided a power-window safety device which opens and closes a window glass of an automotive vehicle by use of a drive motor, and which carries out a safety control operation—to prevent an object from being caught—by detecting an opening/closing position of the window glass. The safety device includes: an angular position sensor for detecting an angular position of the drive motor; position detecting means for detecting an opening/closing position of the window glass on the basis of an output signal of the angular position sensor; and safety control means for carrying out a safety control operation—to prevent an object from being caught—in accordance with an output signal of the position detecting means. In the safety device, the angular position sensor includes a magnet mounted on a rotary output shaft of the motor, and a magnetic flux sensor. The magnetic flux sensor is disposed so as to face the magnet, and detects a variation of the magnetic flux from the magnet. The variation of the magnetic flux is caused by a rotation of the rotary output shaft, therefore an opening/closing position of the window glass is detected on the basis of a detect signal derived from the magnetic flux sensor. A reduction mechanism reduces the rotary output shaft's rotational speed. The magnetic flux sensor preferably contains a plurality of Hall ICs which are disposed at different angular positions around the rotary output shaft of the motor. Each of the Hall ICs processes a voltage output from its Hall element into a voltage which linearly varies in amplitude with respect to a rotational angle of the rotary output shaft. The position detecting means then detects an opening/closing position of the window glass on the basis of the voltage output from each Hall IC.

In the present invention, the angular position sensor—for detecting an angular position of the drive motor, which angular position has a correlation with an opening/closing position of the window glass—includes a magnet and a Hall IC detector. The magnet is mounted on a rotary output shaft of the motor for opening and closing the window glass. The Hall IC detector contains one or more Hall ICs for detecting a variation of the magnetic flux from the magnet, which change in magnetic flux is caused by a rotation of the rotary output shaft. Therefore, the safety device can detect a full stroke of the window movement—which ranges from a position where the window is fully opened to another position where the window is fully closed—by use of only the output signal of the Hall IC detector. This feature contributes to size reduction and circuit simplification, and makes the device easy to assemble into automotive vehicles. The opening/closing position of the window glass is detected by detecting an angular position of the rotary output shaft of the drive motor. With this unique feature, a change in rate of the output voltage with respect to the change in window position may be set at a large value. Further, the opening/closing position of the window glass is detected on the basis of the result from a process of linearly approximating the output voltage of the Hall element of the Hall IC detector. Therefore, a computing operation for determining window position is easy. Furthermore, there is no need for providing an additional mechanical detecting mechanism, such as the window glass position detecting mechanism. As a result, the safety device of the present invention can account for variations in the ambient conditions during its position detecting operation.

BRIEF DESCRIPTION OF THE DRAWINGS

Preferred embodiments of the present invention now will be described with reference to the accompanying drawings, wherein:

FIG. 4 is a diagram explaining the detecting principle of a Hall IC detector of the power window device, wherein

DETAILED DESCRIPTION OF THE INVENTION

Figure 1:
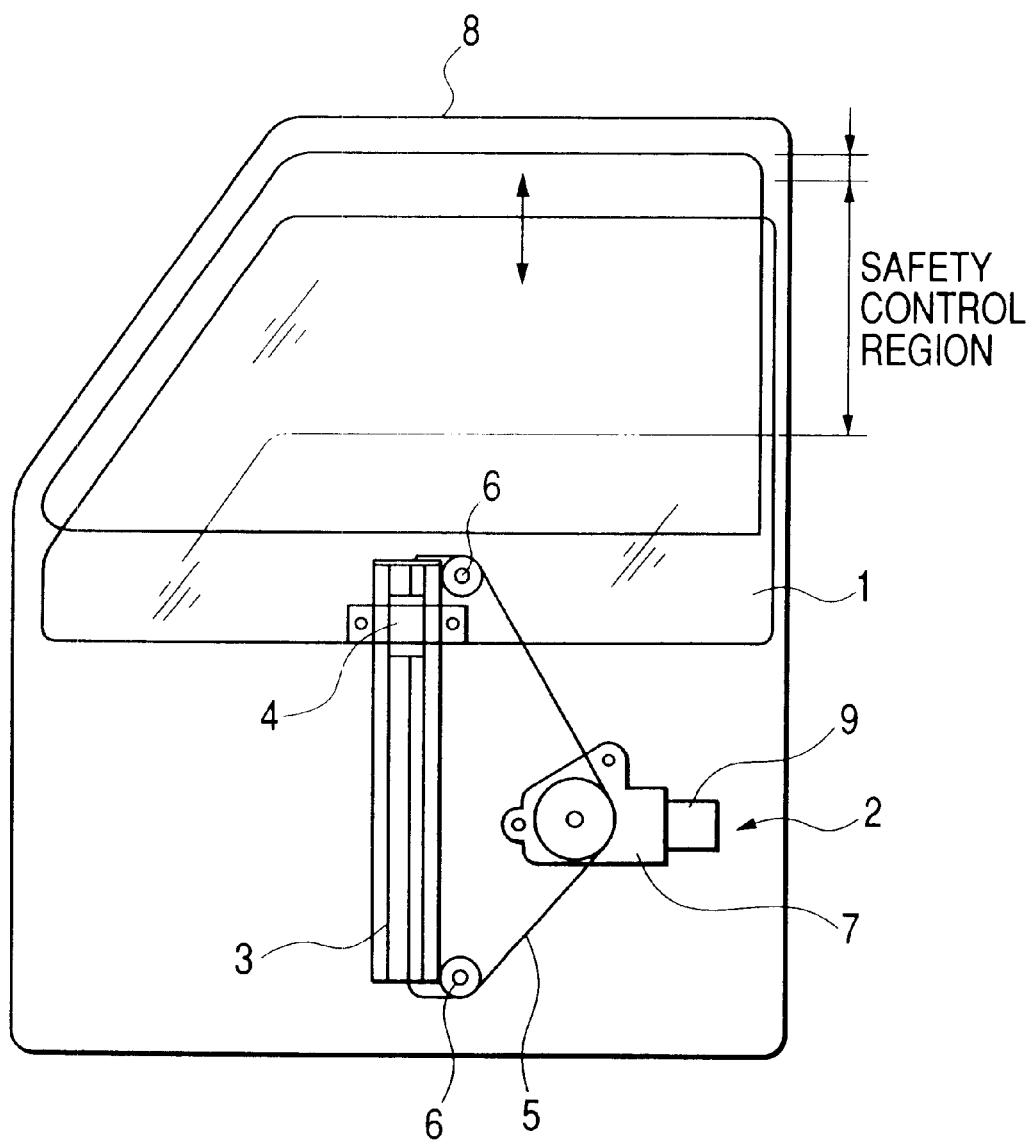
FIG. 1 is a diagram showing a model of a power window device into which the present invention is incorporated.

A preferred embodiment of the present invention will be described with reference to the accompanying drawings. FIG. 1 is a diagram showing a model of a power window device into which the present invention is incorporated. A window glass 1 is opened and closed by an opening/closing mechanism 2, which is provided on a vehicle body under a window of an automotive vehicle. A rail 3 is vertically arranged on the vehicle body, and holds a slider 4 while allowing the slider to vertically slide along the rail. The slider 4 is coupled with a wire 5. The wire 5 is wound around pulleys 6, which are respectively located at the top and bottom of the rail 3. The wire 5 is also coupled to a power window driver 7.

When the power window driver 7 is driven, the slider 4 is vertically moved by way of the wire 5 coupled to the power window driver. The window glass 1 is mounted on the slider 4. When the window glass is vertically moved together with the slider 4, it closes a window space defined by a sash 8. The power window driver 7 includes a motor 9 as a drive source. A rotational force, generated by the motor, rotationally moves the wire 5 to vertically move the window glass 1. When the motor 9 is forwardly turned, the window glass 1 is upwardly moved to close the window space. When the motor 9 is reversed, the window glass 1 is downwardly moved to open the window space.

Figure 2:
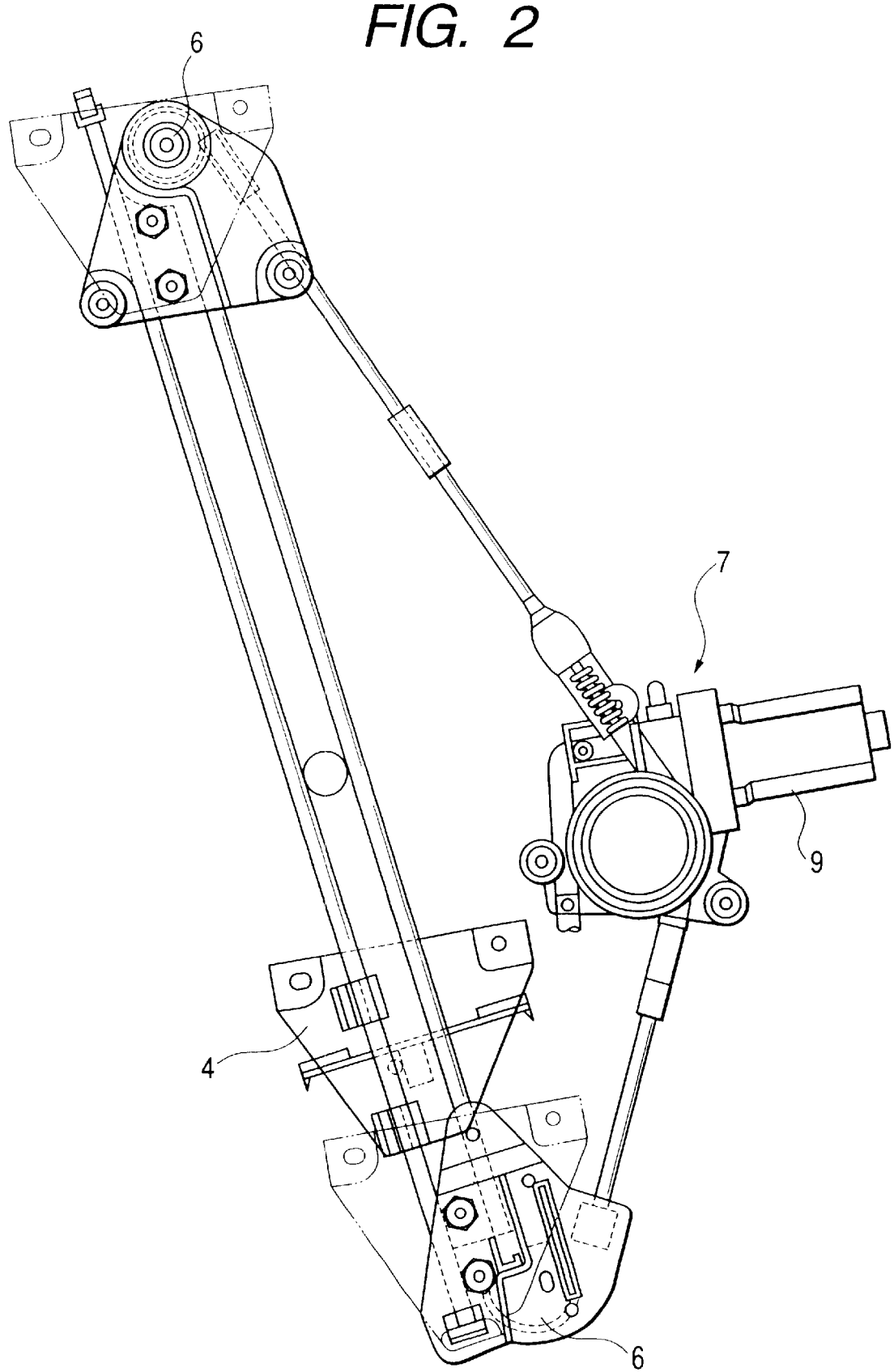
FIG. 2 is a front view showing the power window device.

FIG. 2 is a front view showing the power window device. Like reference numerals are used for designating like or equivalent portions in FIG. 1.

Figure 3A:
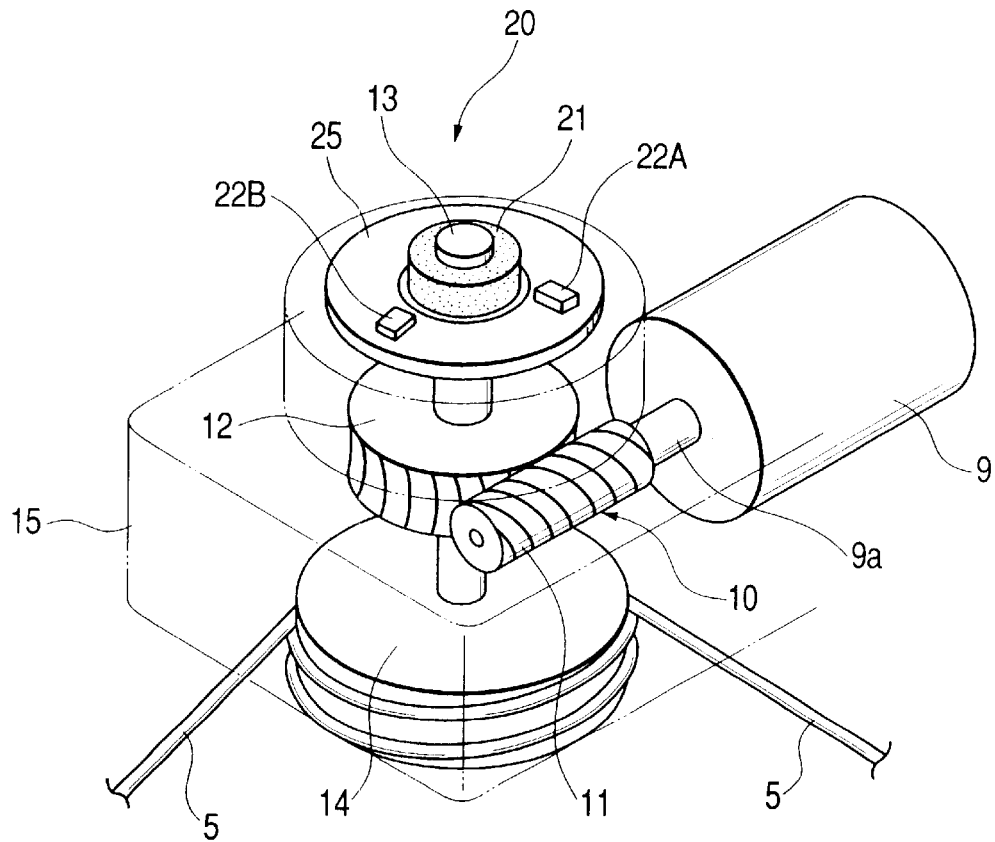
FIG. 3A is a perspective view showing a power window driver.

A key portion of the power window driver 7 is shown in FIG. 3A. As shown in FIG. 3A, the power window driver 7 includes the electrically driven motor 9, a reduction mechanism 10 for reducing the motor's rotational speed and for driving the wire 5, and a Hall IC detector 20 for detecting a rotational angle of the motor's rotary shaft 9a. Reduction mechanism 10 includes a worm gear 11, which is fastened to one end of the rotary shaft 9a, and a worm wheel 12 which is in mesh with the worm gear 11. A pulley 14, around which the wire 5 is disposed, is fastened to one end of an output shaft 13, which is rotated together with the worm wheel 12. The pulley 14 is mounted on a case 15 that is integral with the motor 9.

With the above-described power window device, when the motor 9 is driven, the pulley 14 is driven by the reduction mechanism 10, and the wire 5 is turned so as to move the window glass 1 in the opening or closing direction. In this embodiment, when the pulley 14 is turned three or four times, the window glass 1 moves through a full stroke of opening or closing.

Figure 3B:
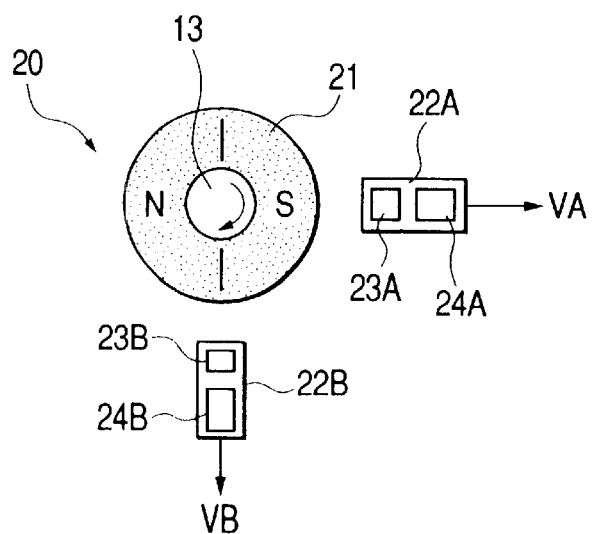
FIG. 3B is a front view of the power window driver.

The output shaft 13, as viewed from the top, is shown FIG. 3B. As shown, the Hall IC detector 20 is disposed around the top end of the output shaft 13. An annular magnet 21, which consists of two sections, N and S poles, is integrally mounted on the top end of the output shaft 13. First and second Hall ICs 22A and IC 22B are disposed on a disc-like substrate 25 that is fastened to the case 15 of the motor, yet are close to the annular magnet 21. As shown, the Hall ICs 22A and 22B are located close to the annular magnet 21 but are at two different positions angularly spaced from each other. The first Hall IC 22A includes a Hall element 23A and an operational element 24A. The second Hall IC 22B includes a Hall element 23B and an operational element 24B. The operational element 24A performs a process of linearly approximating the output voltage of the Hall element 23A associated therewith, and produces an output voltage VA, which linearly varies or has a linear characteristic. The operational element 24B likewise performs a process of linearly approximating the output voltage of the Hall element 23B associated therewith, and produces an output voltage VB, which linearly varies or has a linear characteristic. The first and second Hall ICs 22A and 22B are angularly spaced 90° from each other about the center of the output shaft 13 which is also the center of the annular magnet 21.

Figure 4A:
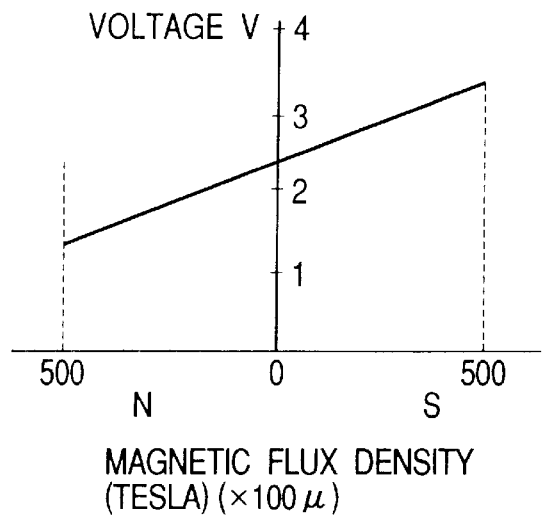
FIG. 4A shows the output voltage from the Hall elements.
Figure 4B:
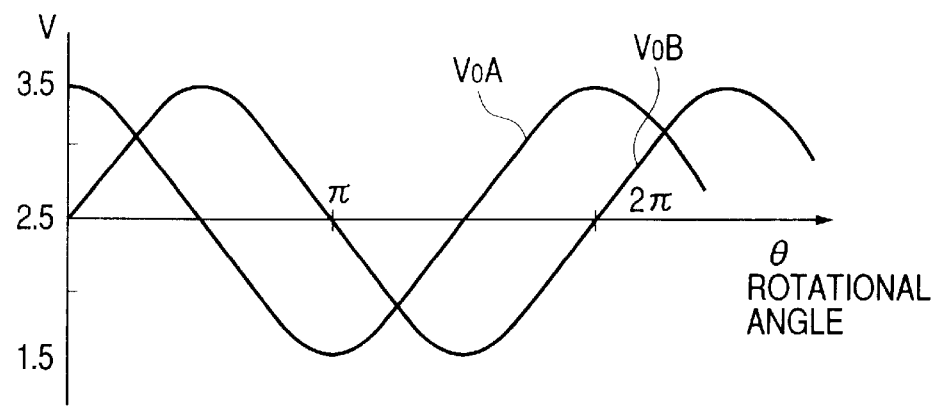
FIG. 4B shows the output voltage from the Hall elements when the angular magnet is rotated.

In the Hall IC detector 20, the Hall elements 23A and 23B of the Hall ICs 22A and 22B produce output voltages as shown in FIG. 4A. As shown, each output voltage is proportional to a density of a magnetic flux caused by a magnetic field in which the element is placed. As described above, when the motor 9 is driven, a rotational force is transmitted from the worm gear 11 of the rotary shaft 9a to the worm wheel 12, the output shaft 13 is rotated, and the window glass 1 is opened or closed, while at the same time the annular magnet 21 is rotated. When the annular magnet 21—with the S and N poles—is rotated, a density of the magnetic flux developed by the magnet varies with respect to the Hall elements 23A and 23B. In this state, the Hall elements 23A and 23B produce output voltages VoA and VoB (FIG. 4B). As shown, each output voltage VoA, VoB takes a waveform defined by a trigonometric function, and varies between 1.5V and 3.5V with respect to 2.5V, for example. As noted above, the Hall elements 23A and 23B of the Hall ICs 22A and 22B are angularly arranged at 90° from one another. Therefore, a phase difference of 90° is present between the waveforms of the output voltages VoA and VoB of the Hall elements 23A and 23B.

Figure 4C:
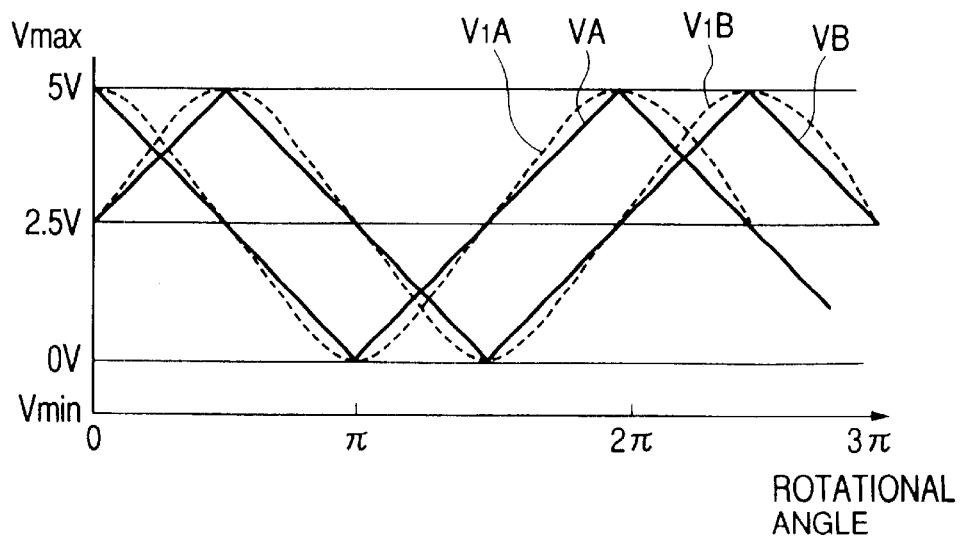
FIG. 4C shows a linear approximation of the output voltages shown in FIG. 4B.

The output voltage VoA of the Hall element is processed for linear approximation by the operational element 24A, and is output in the form of an output voltage VA whose characteristic is linear in variation. The output voltage VoB is also linearly approximated by the operational element 24B, and is output as an output voltage VB having a similar characteristic as that of output voltage VA. To be more specific, the detect voltages VoA and VoB—output from the Hall elements 23A and 23 are level-adjusted and shifted. The voltages VoA and VoB are level-adjusted and shifted by the operational elements 24A and 24B, into voltages V1A and V1B which sinusoidally vary between 0V and 5V as indicated by a broken line in FIG. 4C. In this instance, the detect voltage V1A (V1B) takes a waveform that sinusoidally varies at periods $\theta=2\pi$. Therefore, the detect voltage V1A (V1B) is converted into the output voltage VA (VB), having a triangular waveform whose slope is rectilinear, by approximating each slope of the detect voltage V1A (V1B)—between a minimum voltage Vmin (0V in this instance) and a maximum voltage Vmax (5V) during the half period—into a rectilinear line. The output voltage VA thus obtained is mathematically expressed by $$VA = a1 \cdot \theta + b1 \quad (1)$$

$$\text{where } a1 = \pm(V\text{max} - V\text{min})/\pi \quad (2)$$

Substituting the equation (2) into the equation (1), then we have $$VA = \pm[(V\text{max} - V\text{min})/\pi] \cdot \theta + b1 \quad (3)$$

The output voltage VB is given by $$VB = a2 \cdot \theta + b2 \quad (4)$$

Assuming that the Hall element 23A of the first Hall IC 22A has the same characteristic as of the Hall element 23B of the second Hall IC 22B, then a2=a1, and $$VB = \pm[(V\text{max} - V\text{min})/\pi \cdot +b2 \quad (5)$$

Here, b1 and b2 are initial values when $\theta=0$ in the Hall elements 23A and 23B of the Hall ICs 22A and 22B.

Figure 5:
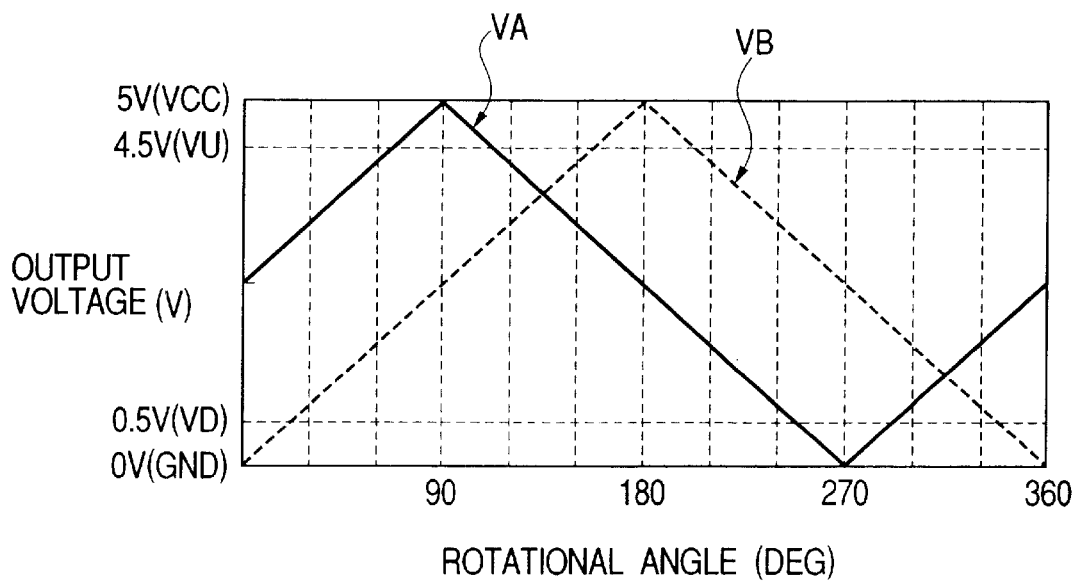
FIG. 5 is a graph showing characteristic curves of the output voltages VA and VB of the Hall IC detector.

Characteristic curves of the output voltages VA and VB produced when the angular positions of the output shaft 13 are set at given initial positions of the Hall ICs 22A and 22B, are shown in FIG. 5.

Figure 6:
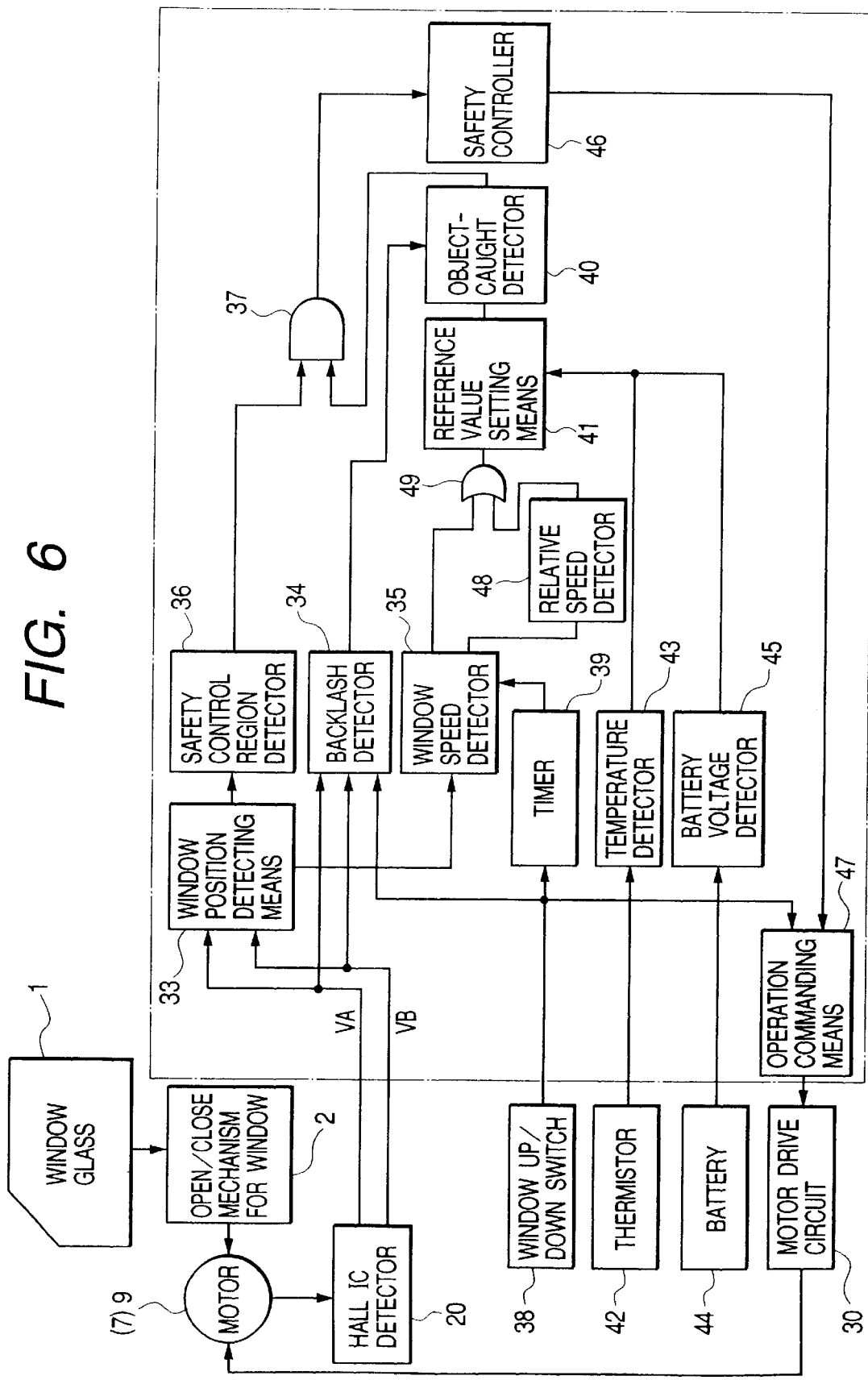
FIG. 6 is a block diagram showing an overall arrangement of a power-window safety device which utilizes the output voltage signals of the Hall IC detector.

FIG. 6 is a block diagram showing an overall arrangement of a power-window safety device which utilizes the output voltage signals of the above-described Hall IC detector. The power window driver 7 is driven to rotate in a forward or reverse direction by a motor drive circuit 30. When the drive motor 9 rotates, the window is opened or closed and, at the same time, the first and second Hall ICs 22A and 22B produce output voltages VA and VB having the linear characteristic as described above. Those voltages VA and VB are input to window position detecting means 33.

Figure 7:
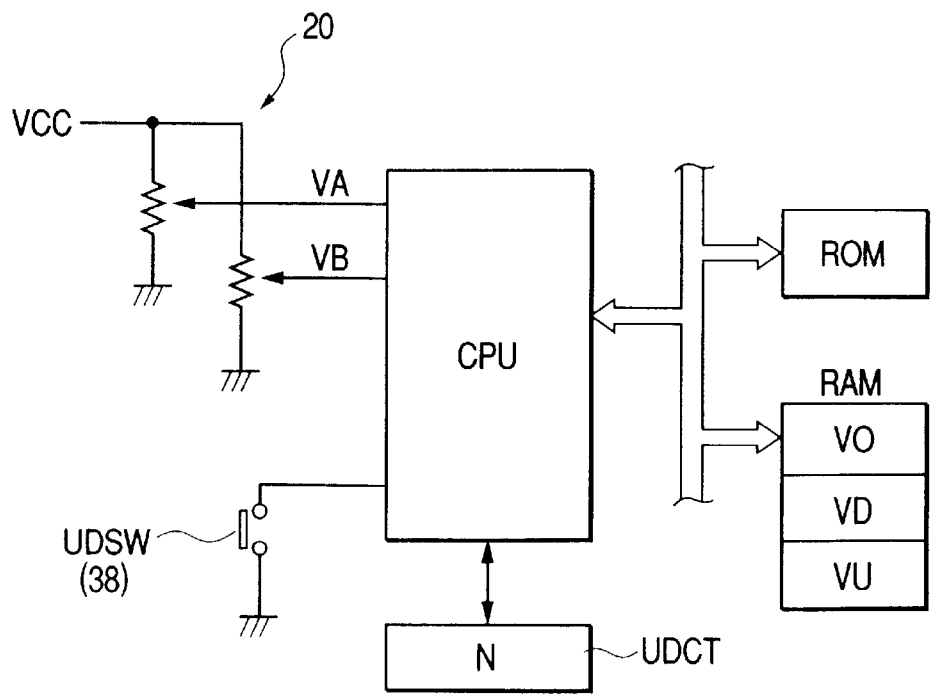
FIG. 7 is a block diagram showing an arrangement of the window position detecting means.

FIG. 7 is a block diagram showing an arrangement of the window position detecting means 33. As shown, the window position detecting means 33 includes a CPU which receives the output voltages VA and VB of the Hall IC detector 20 and which receives a status signal of a an up/down switch UDSW (38) for selecting a closing (up) direction or an opening (down) direction of the window. Further, the window position detecting means includes a ROM for storing operation programs used by the CPU, a RAM for storing various setting voltages obtained from the output voltages VA and VB, and an up/down counter UDCT for selecting the output voltage VA or VB.

Figure 8:
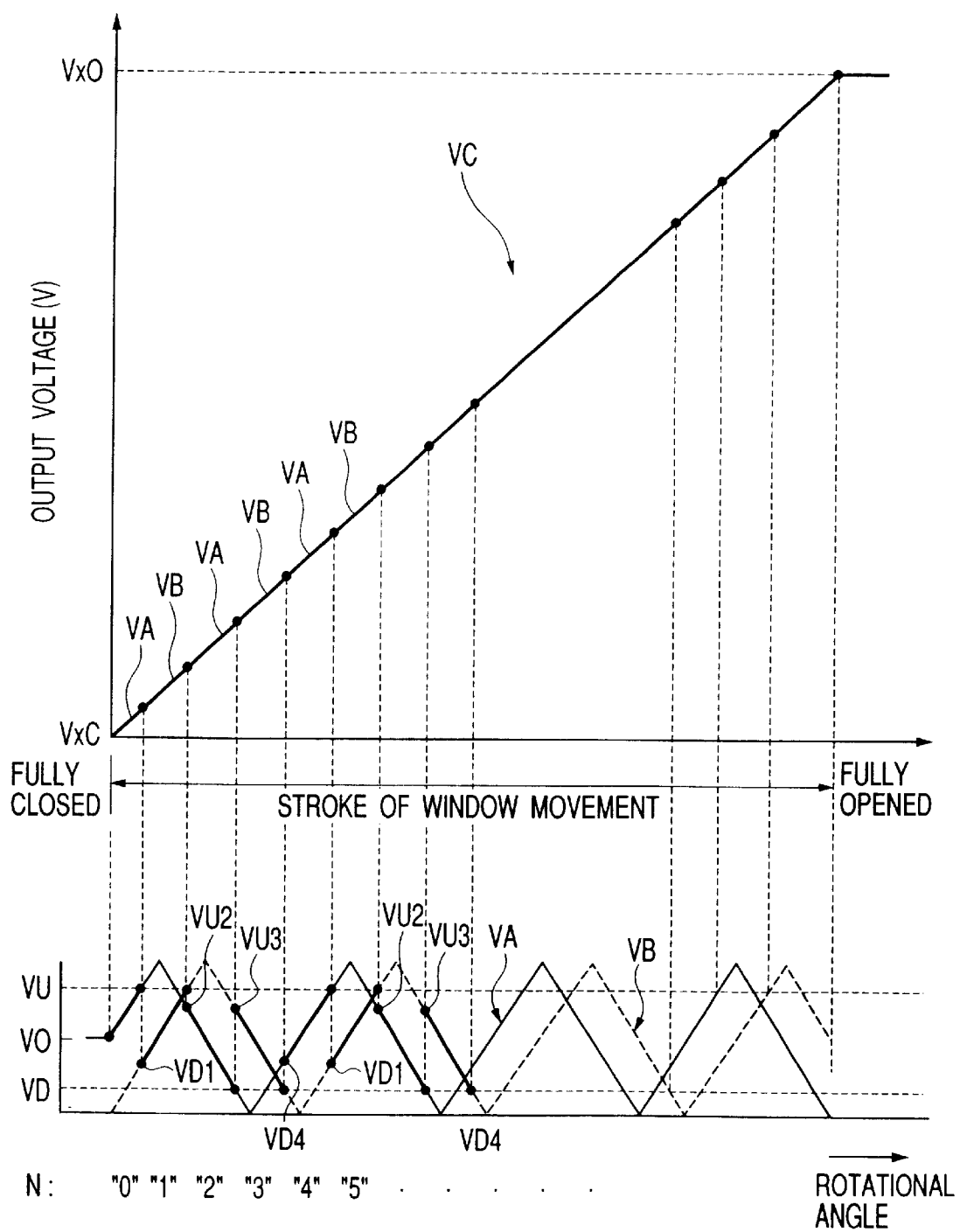
FIG. 8 is a graph showing a relationship between an output voltage and an opening/closing stroke of the window, which explains a position detecting method by the Hall IC detector.

The window position detecting means 33 processes, by computing, the output voltages VA and VB so as to produce a continuous output voltage VC as shown in FIG. 8. As shown in FIG. 8, a maximum detect voltage VU is set at 4.5V, which is 0.5V lower than the maximum voltage 5V of the output voltage VA (VB) from the Hall IC detector 20, viz., it is set having a margin of 0.5V for the top peak value of the output voltage. A minimum detect voltage VD is set at 0.5V, which is 0.5V higher than the minimum voltage 0V of the output voltage VA (VB). In the figure, V0 indicates a value of the output voltage VA at the full opening position of the window. VD1 indicates a value of the output voltage VB when the output voltage VA is equal to the maximum detect voltage VU. VU2 indicates a value of the output voltage VA when the output voltage VB is equal to the maximum detect voltage VU. VU3 indicates a value of the output voltage VB when the output voltage VA is equal to the minimum detect voltage VD. VD4 indicates a value of the output voltage VA when the output voltage VB is equal to the minimum detect voltage VD. In FIG. 8, "0", "1", "2", "3", "4", . . . indicate count values of the up/down counter UDCT.

Figure 9:
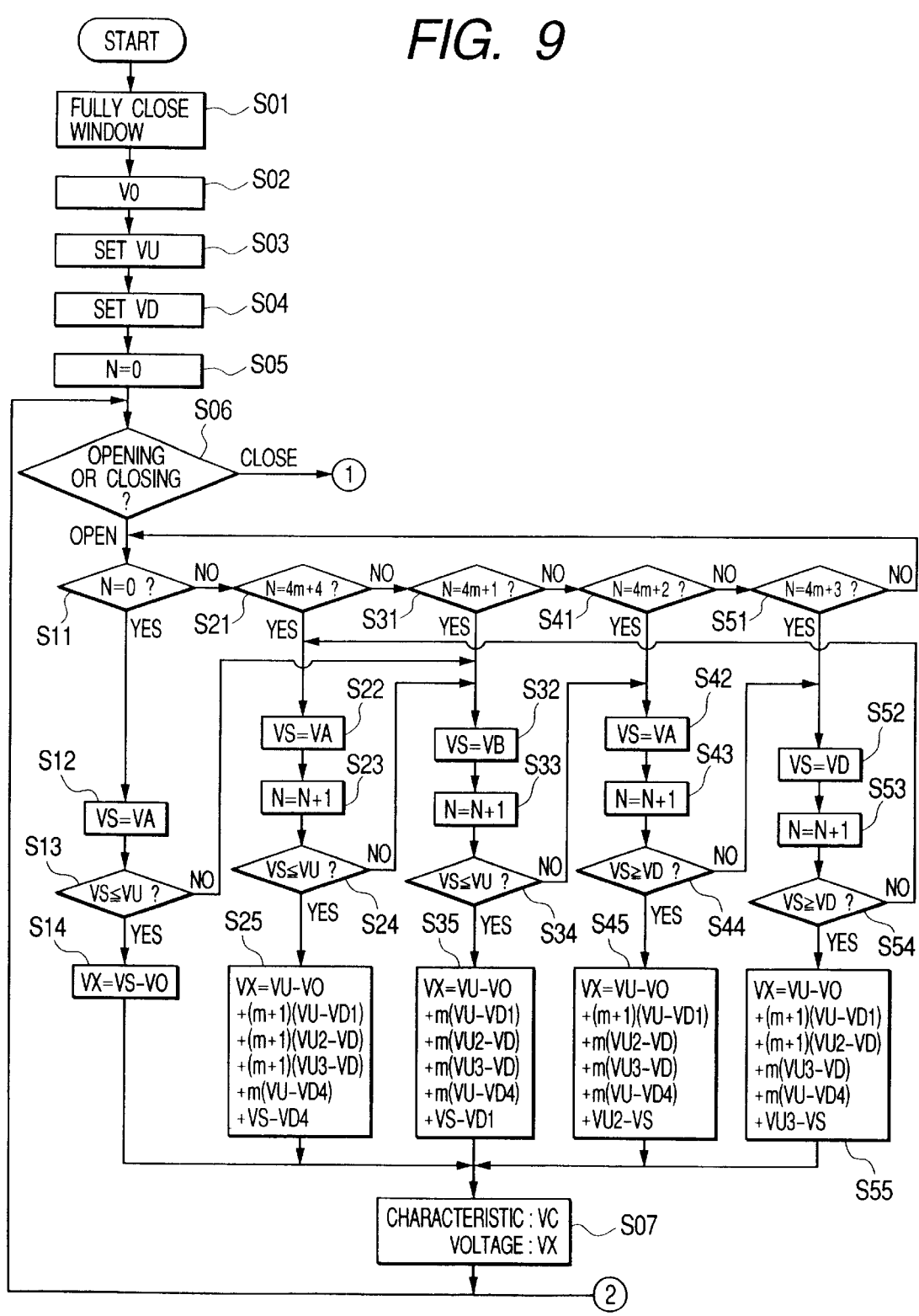
FIG. 9 is a flow chart showing a position detecting operation of the window position detecting means.

FIG. 9 is a flow chart showing a position detecting operation of the window position detecting means 33. The power window device of the invention is initialized in a factory when it is assembled into an automotive vehicle. In order to initialize the power-window device, the window glass 1 is upwardly moved to fully close the window (step S01), and the window glass is locked. In this state, one of the output voltages VA and VB is detected. In this embodiment, the output voltage VA is detected, and it is stored as a full close voltage V0 into the RAM (step S02). Further, 5V is detected, wherein 5V is the top peak voltage of the output voltage VA (VB) from the Hall IC detector 20. Then, 4.5V, which is 0.5V lower than the peak voltage 5V, is stored as a maximum detect voltage VU into the RAM (S03). Subsequently, 0.0V, which is the bottom peak of the output voltage VA (VB) of the Hall IC detector 20 is detected, and 0.5V, which is 0.5V higher than the bottom peak voltage, is stored as the minimum detect voltage VD into the RAM (S04). Thereafter, a count value N of the up/down counter UDCT is set to be equal to q (N=q)(S05). The initializing process may be carried out, as needed, to reset the power-window device after manufacturing the automotive vehicle.

The power-window device, after having undergone the initializing process, detects a position of the window glass, as follows. First, the output voltages VA and VB of the Hall IC detector 20 are detected and, at the same time, the CPU detects whether or not the moving direction of the window is an opening or closing direction by detecting an opening/closing signal of the window up/down switch UDSW (S06). When the window is moving in the opening direction, the CPU checks a count value N of the up/down counter UDCT (step S11). If N=0, the CPU sets the output voltage VA at voltage VS, VA=VS (step S12), and compares it with the maximum detect voltage VU (step S13). When VS≦VU, the CPU computes the difference in voltage Vx by the following equation (step S14)

$$Vx=VS-V0 \quad (11)$$

where V0=the full close voltage.

The voltage Vx is made to correspond to a "0" region of the characteristic curve VC in FIG. 8, thereby detecting a window position (step S07). That is, the window position is obtained by use of the FIG. 8 graph showing the output characteristic in a manner that the window position on the abscissa is specified by the voltage Vx on the ordinate.

In a step S13, when VS≧VU, the output voltage VB is used for the voltage VS, VB=VS (step S32). The CPU increments a count value N of the up/down counter UDCT by one, N=N+1 (step S S33). The CPU compares the voltage VS with the maximum detect voltage VU (step S34). When VS≦VU, the CPU computes the voltage Vx by using the following equation (step S35)

$$Vx=VU-VO+m\ (VU-VD1)+m\ (VU2-VD)+m\ (VU3-VD)+m\ (VU-VD4)+VS-VD1 \quad (12)$$

In the equation, VS is the above-mentioned voltage, V0 is the full close voltage, VD is the minimum detect voltage VD, VU is the maximum detect voltage VU, and VD1, VU2, VU3 and VD4 are the different values of the voltages VU and VD. The computed voltage Vx is made to correspond to a "1" region of the characteristic curve VC of FIG. 8, thereby detecting another window position (step S07). In the above equation, "m" is a positive integer containing 0.

In a step S34, when VS≧VU, the output voltage VA is used for the voltage VS, VA=VS (step S42), the CPU increments the count value N by one, N=N+1 (step S43). It compares the voltage VS with the minimum detect voltage VD (step S44). When VS≧VD, the CPU executes a step S45. In this step, the CPU computes the voltage Vx by using the following equation $$Vx=VU-VO+(m+1)\ (VU-VD1)+m\ (VU2-VD)+m\ (VU3-VD)+m\ (VU-VD4)+VU2-VS \quad (13)$$

The difference voltage Vx is made to correspond to a "2" region of the characteristic curve VC of FIG. 8, thereby detecting a yet another window position (step S07).

When VS≦VD in a step S44, the CPU uses the output voltage VB for the voltage VS, VB VS (step S52), increment the count value N by one, N=N+1 (step S53), and compares the voltage VS with the minimum detect voltage VD (step S54). When VS≦VD, the CPU advances to a step S55, and computes the voltage Vx by using the following equation $$Vx=VU-VO+(m+1)\ (VU-VD1)+(m+1)\ (VU2-VD)+m\ (VU3-VD)+m\ (VU-VD4)+VU3-VS \quad (14)$$

The computed voltage Vx is made to correspond to a "3" region of the characteristic curve VC of FIG. 8, thereby obtaining a window position (step S07).

In a step SS4, when VS≦VD, the CPU uses the output voltage VA for the voltage VS (step SS22), increments the count value N by one, N=N+1 (step S23), and compares the voltage VS with the maximum detect voltage VU (step S24). When VS≦VU, the CPU advances to a step S25 where it computes the difference voltage Vx by the following equation $$Vx=VU-VO+(m+1)\ (VU-VD1)+(m+1)\ (VU2-VD)+(m+1)\ (VU3-VD)+m\ (VU-VD4)+VS-VD4 \quad (15)$$

The computed difference voltage Vx is made to correspond to a "4" region on the characteristic curve VC of FIG. 8, whereby a window position is obtained (step S07). When VS≦VU in the step S24, the CPU returns to the step S32, and executes the subsequent steps as described above.

When the count value N is any value other than "0" in the step S11, viz., the position detecting flow starts at a mid position of the window between the full open position and the full close position, the CPU checks if a value of the N is any of 4m+2, 4m+3 and 4m+4 (where m is a positive integer containing "0") in steps S21, S31, S41 and S51. When N=4m+1, the CPU advances to the step S32, and uses the output voltage VB for the voltage VS, VB=VS. When N=4m+2, the CPU advances to the step S42, and uses the output voltage VA for the voltage VS, VA=VS. When N=4m+3, the CPU advances to the step S52, and uses the output voltage VB for the voltage VS, VB=VS. When N=4m+4, the CPU advances to the step S22, and uses the output voltage VA for the voltage VS, VA=VS. The position detecting flow subsequent to each of those steps is as mentioned above.

Figure 10:
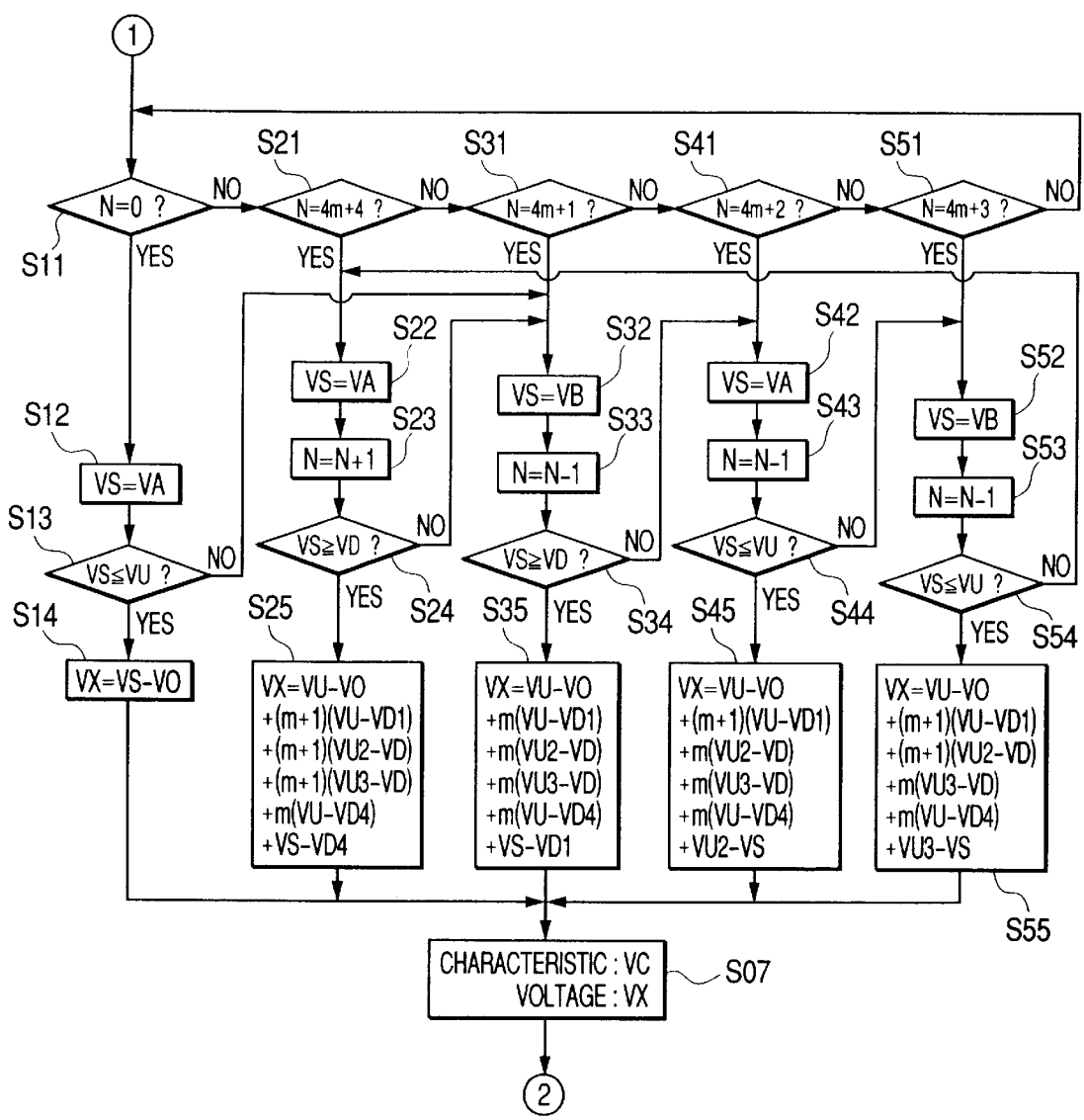
FIG. 10 is a flow chart showing another position detecting operation of the window position detecting means.

A position detecting process of the window position detecting means 33 when the moving direction of the power window device is the opening direction is basically the same as in the position detecting process when the window moves in the closing direction. The position detecting process when the window moves in the closing direction may be effected such that the judging steps "VS≦VU ?" and "VS≧VD ?" in the steps S24, S34, S44 and S54 in the position detecting process when the window moves in the opening direction are substituted by "VS≧VD ?" and "VS≧VD ?". Additionally, the phrase "N=N+1" of the steps S23, S33, S34 and S44 of died man walking incrementing the count value N is substituted by "N=N−1" when the window moves in the closing direction. Thus, the position detecting process for the closing direction may be flow charted as shown in FIG. 10. The like portions in those flow charts are designated by like reference numerals and, for simplicity, no further description of them will be given.

As described above, the voltage Vx, which is related to the characteristic curve VC, is obtained by successively utilizing a portion—indicated by a bold line in FIG. 8—of the voltage characteristics of the output voltages VA and VB. Thus, a window position may be detected on the basis of the voltage VX. The window position detected by the window position detecting means 33, viz., a window opening/closing position, is output to a safety control region detector 36. The safety control region detector 36 detects whether the window is within a safety control region by utilizing the opening/closing position received. The safety control region is a region ranging from a position where the window is fully opened to a position where the window is nearly fully closed. A safety control operation, to prevent an object from being caught, is carried out only in this region. Just before the window is fully closed, the window glass 1 touches a weather strip or the like of the sash 8. This state resembles one wherein an object is caught in the window glass because contact resistance between the window glass and the weather strip is present. An object-caught detector, to be described later, will mistakenly recognize this state as one wherein an object is caught. The safety control region is provided for avoiding such a mistaken recognition. The output signal of the safety control region detector 36 is input to one of the input terminals of an AND gate 37.

The output voltages VA and VB of the Hall IC detector 20 are input to a backlash detector 34. A backlash of the window will occur when the window up/down switch 38 of the power window is turned on, and the window moving direction is switched from the forward direction to the reverse direction and vice versa. At this time, the output voltages VA and VB of the Hall IC detector 20 vary. Thus, the backlash detector 34 detects a backlash of the window glass by use of variations of the output voltages VA and VB from the Hall IC detector 20.

The voltage Vx, which is related to the characteristic curve VC generated by the window position detecting means 33, is input to a window speed detector 35. The window speed detector 35 detects a moving speed of the window glass when it moves to open and close the window space. To detect the speed, the window speed detector 35 measures, by use of a timer 39, a fixed period of time after the window up/down switch 38 has been activated. The window speed detector 35 then performs an operation—utilizing a variation of the voltage Vx during the fixed time period measured— To detect an absolute speed of the window glass when it is opened and closed. A relative speed detector 48 detects a relative speed as its changing speed. The absolute speed and the relative speed are then input to a reference value setting means 41.

Figure 11:
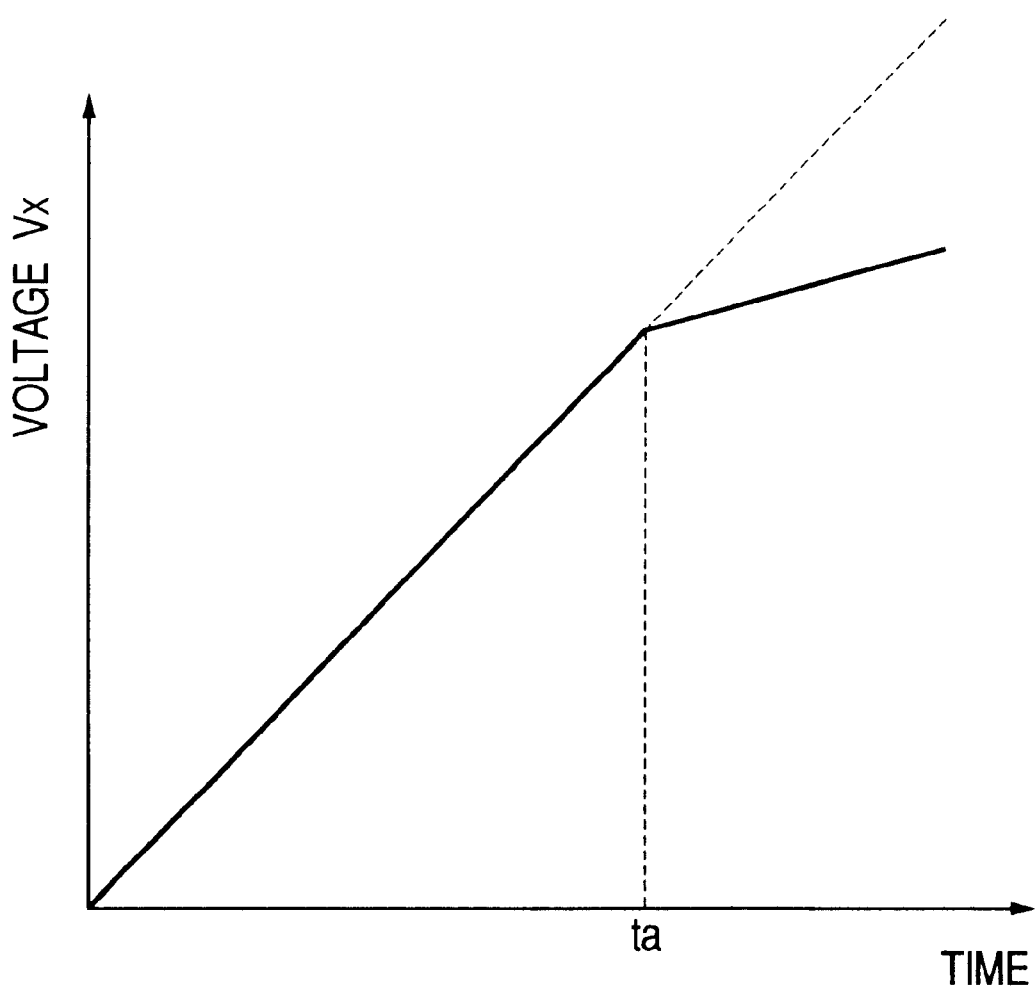
FIG. 11 is a graph showing a characteristic variation (speed) of voltage Vx with respect to time.

The object-caught detector 40 detects a state wherein an object is caught in the window glass, by utilizing signals output from the backlash detector 34 and the window speed detector 35. To detect an object-caught state, the absolute speed or the relative speed of the window when it is moved for its closing is compared with an absolute reference speed or a relative reference speed that is stored in the reference value setting means 41 when no backlash occurs. When the speed of the closing window is lower than the reference speed, it is detected that an object has been caught in the window. For the object-caught state detection, let us consider a case wherein the voltage Vx is varied with time as shown in FIG. 11. In this case, a gradient of a curve representing a variation of the voltage Vx is the absolute speed. The gradient of the voltage variation curve changes at a time point "ta". From the curve, it is seen that an object is caught in the window at the time point "ta". By detecting this change in gradient, the object-caught detector 40 detects the object-caught state. An object-caught detect signal is then output from the object-caught detector to a second input terminal of the AND gate 37. In this embodiment, the absolute and relative reference speeds are preset in the reference value setting means.

However, the preset reference speeds are varied when ambient temperature and battery voltage vary. To achieve this variation in preset reference speeds, the safety device of the embodiment utilizes output signals of a temperature detector 43 having a thermistor 42, and a battery voltage detector 45 for detecting a voltage of a battery 44.

When the window is within the safety control region and an object-caught state is detected, the AND gate 37 is conditioned to produce a safety control signal for transmission to a safety controller 46. Upon receipt of the safety control signal, the safety controller 46 outputs an operation command to an operation commanding means 47. In turn, the operation commanding means 47 controls the motor drive circuit 30 to turn the drive motor 9 in the reverse direction, or in the opening direction, by a predetermined amount of turn. As a result, when the hand or finger of a passenger or the like is accidentally caught between the window glass 1 and the sash 8, the window is immediately opened to release his hand or finger from being caught. In this way, The safety control of the power window is carried out.

Thus, an angular position of the drive motor 9, or an opening/closing position of the window glass 1, is obtained from the voltage Vx which, in turn, is based on the voltages VA and VB output from the Hall IC detector 20 through the rotation of the output shaft 13. Therefore, the power-window safety device can detect a minute variation of the window glass position and, hence, control the window glass position with high accuracy. Further, the safety device can detect the safety control region on the basis of the voltages output from the Hall IC detector 20. Therefore, there is no need for providing an additional window glass position detecting mechanism. This feature leads to simplification in construction of the whole device. The weather strip which comes into contact with the window glass, when the window is fully closed, will be deformed when ambient conditions of temperature and the like vary, thereby varying the safety control region. However, even if the ambient conditions vary, the safety device of the present invention is capable of accounting for such variations in the ambient conditions and, thereby, is capable of accurately recognizing the safety control region.

In this embodiment, the output voltages VA and VB of the Hall IC detector 20 characteristically vary between 0V and 5V in accordance with the rotational period of the output shaft 13. With this unique feature, a rate of change in the voltage with respect to the change in window position may be set at a large value. As a result, a resolution of the window position detection is increased. Further, the voltage may be output over the entire range of one complete rotation of the drive motor 9. In other words, there is no chance that zero voltage is output at some angular positions. Accordingly, stabilization of the output voltage characteristic is realized. As a result, the window position is highly accurately detected, and the safety control device of the present invention has an extremely high reliability.

In the above-mentioned embodiment, a rotational angle of the output shaft 13 is directly detected by use of the Hall ICs 22A and 22B in the Hall IC detector 20. Where a higher degree of accuracy is required for detecting the window position, more Hall element detectors may be disposed corresponding to the output shaft. In the embodiment mentioned above, two Hall ICs are used. If required, one Hall IC, or three or more Hall ICs may be used, depending on the accuracy that is required.

In the above-mentioned embodiment, Hall IC detector is used to detect a rotation angle of the output shaft. However, the present invention is not limited thereto. For example, an optical sensor may be used to detect a rotational angle of the output shaft. As seen from the foregoing description, the power-window safety control of the present invention includes an angular position sensor—for detecting an angular position of a drive motor—comprising a magnet mounted on a rotary output shaft of a drive motor for opening and closing the window glass, and a magnetic flux sensor, such as a Hall IC, for detecting a variation of the magnetic flux from the magnet, which variation of magnetic flux is caused by a rotation of the rotary output shaft. Therefore, the safety device can detect a full stroke of the window movement, which ranges from a position where the window is fully opened to another position where the window is fully closed, by use of only the signal output from the angular position sensor. This feature contributes to size reduction and circuit simplification and, thus, makes the device easy to assemble into automotive vehicles. The opening/closing position of the window glass is detected by detecting an angular position of the rotary output shaft of the drive motor. With this unique feature, a change in rate of the output voltage with respect to the change in window position may be set at a large value. Further, the opening/closing position of the window glass is detected on the basis of a linear approximation of the voltage output from the angular position sensor. Therefore, a computing operation for position detection is easy. Furthermore, there is no need for providing an additional mechanical detecting mechanism, such as a window glass position detecting mechanism. As a result, the safety device of the present invention accounts for variations in the ambient conditions in its position detecting operation.

It is contemplated that numerous modifications may be made to the power-window saftey device of the present invention without departing from the spirit and scope of the invention as defined in the following claims.

What is claimed is:

1. A power-window safety device in combination with a drive motor which is connected to a window glass of an automotive vehicle to open and close the window glass, wherein said power-window safety device carries out a safety control operation to prevent an object from being caught by detecting an opening/closing position of the window glass, said safety device comprising:

an angular position sensor for constantly measuring an angular position of said drive motor;

a reduction mechanism which reduces the rotational speed of a rotary shaft of said drive motor;

position detecting means for detecting an opening/closing position of said window glass on the basis of an output signal of said angular position sensor; and safety control means for carrying out a safety control operation, to prevent an object from being caught, in accordance with an output signal of said position detecting means;

wherein said angular position sensor comprises a magnet supported on an output shaft of said reduction mechanism, and a magnetic flux sensor, disposed facing said magnet, for detecting a variation of the magnetic flux from said magnet, which is caused by a rotation of said rotary output shaft, whereby an opening/closing position of said window glass is detected on the basis of a detect signal derived from said magnetic flux sensor wherein said magnetic flux sensor outputs a voltage that is substantially linear in variation across 180° segments of rotation of said rotary output shaft, and periodically alternates.

2. A power-window safety device according to claim 1, wherein said magnetic flux sensor includes a Hall IC detector containing a plurality of Hall ICs, wherein each of said plurality of Hall ICs is disposed at a different angular positions around said output shaft of said reduction mechanism.

3. A power-window safety device according to claim 2, wherein each of said Hall ICs processes a voltage output from its Hall element into a voltage which linearly varies in amplitude with respect to a rotational angle of said rotary output shaft, and said position detecting means detects an opening/closing position of said window glass on the basis of the voltage output from each of said Hall ICs.

4. A power-window safety device in combination with a drive motor which is connected to a window glass of an automotive vehicle to open and close the window glass, wherein said power-window safety device carries out a safety control operation to prevent an object from being caught by detecting an opening/closing position of the window glass, said safety device comprising:

an angular position sensor for constantly measuring an angular position of said drive motor;

a reduction mechanism which reduces the rotational speed of a rotary shaft of said drive motor;

a position detecting circuit which detects an opening/closing position of said window glass on the basis of a signal output from said angular position sensor; and a safety control circuit which carries out a safety control operation, to prevent an object from being caught, in accordance with a signal output from said position detecting circuit;

wherein said angular position sensor comprises a magnet supported on an output shaft of said reduction mechanism, and a magnetic flux sensor, disposed facing said magnet, for detecting a variation of the magnetic flux from said magnet, which variation of the magnetic flux is caused by a rotation of said rotary output shaft, whereby an opening/closing position of said window glass is detected on the basis of a detect signal derived from said magnetic flux sensor wherein said magnetic flux sensor outputs a voltage that is substantially linear in variation across 180° segments of rotation of said rotary output shaft, and periodically alternates.

5. A power-window safety device according to claim 4, wherein said magnetic flux sensor includes a Hall IC detector containing a plurality of Hall ICs, wherein each of said plurality of Hall ICs is disposed at a different angular positions around said output shaft of said reduction mechanism.

6. A power-window safety device according to claim 5, wherein each of said Hall ICs processes a voltage output from its Hall element into a voltage which linearly varies in amplitude with respect to a rotational angle of said rotary output shaft, and said position detecting circuit detects an opening/closing position of said window glass on the basis of the voltage output from each of said Hall ICs.

7. A power-window safety device in combination with a drive motor which is connected toy a window glass of an automotive vehicle to open and close the window glass, wherein said power-window safety device carries out a safety control operation to prevent an object from being caught by detecting an opening/closing position of the window glass, said safety device comprising:

an angular position sensor for constantly measuring an angular position of said drive motor, including a first sensor which outputs a first detection signal periodically changing in accordance with a rotation of an output shaft of the motor, and a second sensor which outputs a second detection signal which is shifted from said first detection signal by $\pi/2$ in phase;

a reduction mechanism which reduces the rotational speed of a rotary shaft of said drive motor;

position detecting means for detecting an opening/closing position of said window glass on the basis of said first and second detection signals; and safety control means for carrying out a safety control operation, to prevent an object from being caught, in accordance with an output signal of said position detecting means, wherein said angular position sensor comprises a magnet supported on an output shaft of said reduction mechanism; and wherein said first detection signal and second detection signal are substantially linear in variation across 180° segments of rotation of said rotary output shaft.

* * * * *